(12) United States Patent
McClain et al.

(10) Patent No.: US 9,290,865 B2
(45) Date of Patent: Mar. 22, 2016

(54) THREE-DIMENSIONAL WOVEN CORNER FITTING WITH LAP JOINT PREFORMS

(71) Applicant: Albany Engineered Composites, Inc., Rochester, NY (US)

(72) Inventors: Michael McClain, Barnstead, NH (US); Jonathan Goering, York, ME (US)

(73) Assignee: Albany Engineered Composites, Inc., Rochester, NH (US)

(*) Notice: Subject to any disclaimer, the term of this patent is extended or adjusted under 35 U.S.C. 154(b) by 56 days.

(21) Appl. No.: 13/727,161

(22) Filed: Dec. 26, 2012

(65) Prior Publication Data

US 2014/0178645 A1 Jun. 26, 2014

(51) Int. Cl.
*D03D 25/00* (2006.01)
*D03D 23/00* (2006.01)
*D03D 3/00* (2006.01)
*B29B 11/16* (2006.01)

(52) U.S. Cl.
CPC .............. *D03D 25/005* (2013.01); *B29B 11/16* (2013.01); *D03D 3/00* (2013.01); *D03D 23/00* (2013.01); *D10B 2101/06* (2013.01); *D10B 2101/08* (2013.01); *D10B 2101/12* (2013.01); *D10B 2331/021* (2013.01); *D10B 2331/04* (2013.01); *D10B 2505/02* (2013.01); *Y10T 428/24479* (2015.01)

(58) Field of Classification Search
None
See application file for complete search history.

(56) References Cited

U.S. PATENT DOCUMENTS

| 4,782,864 | A | 11/1988 | Abildskov |
| 6,446,675 | B1 | 9/2002 | Goering |
| 6,470,916 | B1 | 10/2002 | Uchida et al. |
| 6,712,099 | B2 | 3/2004 | Schmidt et al. |
| 6,733,862 | B2 * | 5/2004 | Goering ........................ 428/121 |

(Continued)

FOREIGN PATENT DOCUMENTS

| WO | WO 02/103098 A | 12/2002 |
| WO | WO 03/023104 A | 3/2003 |

(Continued)

OTHER PUBLICATIONS

Weyrauch, F. et al.: "An innovative Approach on Modular Joints for Carbon Fibre Reinforced Structures".

(Continued)

*Primary Examiner* — David Sample
*Assistant Examiner* — Donald M Flores, Jr.
(74) *Attorney, Agent, or Firm* — Frommer Lawrence & Haug LLP

(57) ABSTRACT

A three-dimensional corner lap joint preform and a method of forming a three-dimensional corner lap joint preform including a woven flange with one or more legs that extend from the flange. The legs may include one or more independently woven portions which allow formation of a corner without darting the leg or adding additional reinforcement. The independently woven portions may include warp fibers which are not woven into the preform. The unwoven area allows removal of a portion of the leg prior to formation of the corner, allowing the portions of the leg to overlap and form a lap joint.

9 Claims, 10 Drawing Sheets

(56) References Cited

U.S. PATENT DOCUMENTS

| | | |
|---|---|---|
| 6,890,612 B2 | 5/2005 | Goering |
| 6,899,941 B2 | 5/2005 | Goering et al. |
| 7,014,805 B1 | 3/2006 | Reis et al. |
| 7,045,084 B1 | 5/2006 | Reis et al. |
| 7,413,999 B2 | 8/2008 | Goering |
| 7,625,510 B2 | 12/2009 | Ashton et al. |
| 7,712,488 B2 | 5/2010 | Goering et al. |
| 7,964,520 B2 | 6/2011 | Goering |
| 8,616,853 B2 * | 12/2013 | Belmonte et al. ............. 416/230 |
| 2006/0121809 A1 | 6/2006 | Goering |
| 2007/0289246 A1 * | 12/2007 | Schmitz ...................... 52/592.1 |
| 2010/0105268 A1 | 4/2010 | Ouellette et al. |
| 2010/0105269 A1 | 4/2010 | Goering et al. |
| 2010/0167007 A1 | 7/2010 | Goering |
| 2011/0110787 A1 * | 5/2011 | Belmonte et al. ......... 416/223 R |
| 2011/0111664 A1 * | 5/2011 | Goering et al. ............... 428/221 |

FOREIGN PATENT DOCUMENTS

| | | |
|---|---|---|
| WO | WO 2010/004216 A1 | 1/2010 |
| WO | WO 2011/059922 A | 5/2011 |

OTHER PUBLICATIONS

European international search report and written opinion dated Feb. 12, 2014.

* cited by examiner

THREE-DIMENSIONAL WOVEN CORNER FITTING WITH LAP JOINT PREFORMS

INCORPORATION BY REFERENCE

All patents, patent applications, documents and/or references referred to herein are incorporated by reference, and may be employed in the practice of the invention.

FIELD OF THE INVENTION

This invention generally relates to three-dimensional (3D) woven preforms and particularly relates to 3D woven preforms used in reinforced composite materials. More particularly, the present invention relates to preforms that can be formed into a corner fitting without darting or requiring additional reinforcing materials. More particularly still, the present invention relates to preforms that can be formed into a corner fitting with lap joints.

BACKGROUND OF THE INVENTION

The use of reinforced composite materials to produce structural components is now widespread, particularly in applications where their desirable characteristics of light weight, high strength, toughness, thermal resistance, and ability to be formed and shaped can be used to great advantage. Such components are used, for example, in aeronautical, aerospace, satellite, high performance recreational products, marine, and other applications.

Typically, such components consist of reinforcement materials embedded in a matrix material. The reinforcement component may be made from materials such as glass, carbon, ceramic, aramid, polyethylene, and/or other materials which exhibit desired physical, thermal, chemical and/or other properties, chief among which is great strength against stress failure. These materials are often fabricated into fibers and used as reinforcing fibers, or the fibers are formed into yarns which are used as reinforcing yarns in the component.

Through the use of such reinforcement materials, which ultimately become a constituent element of a completed component, the desirable characteristics of the reinforcement materials, such as very high strength, are imparted to the completed composite component. The typical constituent reinforcement materials may be woven, knitted or otherwise oriented into desired configurations for reinforcement preforms. In many cases, particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, a resin or matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, bismaleimide, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they will not be of the same materials or have comparable physical, chemical, thermal, or other properties, since a usual objective sought in using composites in the first place is to achieve a combination of characteristics in the finished product that is not attainable through the use of one constituent material alone. So combined, the reinforced preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to, and borne by, the constituent material of the reinforcement preform. Any break or discontinuity in the reinforcement preform limits the ability of the preform to transfer and bear the stress applied to the finished component.

In certain applications, three dimensional (3D) woven composite structures are desired as primary load carrying members. One useful shape of a preform for such members is generally referred to as a "Pi" preform, so called because it resembles the Greek letter pi (Π) in an axial view. Other useful preforms may have different cross sectional shapes, such as T or L for example. Fiber preforms with specific structural shapes can be woven on a conventional shuttle loom, and several existing patents describe the method of weaving such structures (U.S. Pat. Nos. 6,446,675; 6,712,099; 7,712,488, for example).

One of the drawbacks of the use of these preforms is that they cannot be formed into corner fittings without darting the upstanding leg or legs according to conventional methods. By darting the legs, the continuity of the reinforcing material is lost through the corner, removing or reducing the primary load path through the corner. For example, if the preform shapes disclosed above are formed into a corner fitting, excess material of the leg(s) parallel to the plane of the bend (i.e., the inside of the bend) will accumulate and buckle at the inside of the corner.

To maintain the structural integrity of the corner fitting preform, in many cases the addition of reinforcements is required at the cut or cuts, and around the corner itself. The reinforcement is often in the form of sheets or plates of material, typically additional woven material. The additional reinforcement creates a localized increase in thickness and weight of the corner fitting preform. The reinforcement may create a localized weight concentration in the reinforced corner itself.

One such reinforcement for a darted preform is disclosed in U.S. Patent Application Publication No 2011-0111664 A1 the entire content of which is incorporated herein by reference. The reinforcement for a darted preform provided by this reference is in the form of a steered woven fabric which fills the space between the upstanding legs of a Pi preform and is steered by weaving to follow the curvature facilitated by the darting of the legs. After the steered woven fabric is in place, the preform is further processed to form a reinforced composite structure.

Other known methods may require mechanical fasteners, for example, bolts or rivets, to affix the reinforcement to the preform at the corner. However, the use of metal bolts or rivets at the interface of such components is often unacceptable because such fasteners require through holes which further compromise the integrity of the composite structure. Detrimentally, fasteners add weight and introduce different coefficients of thermal expansion as between such elements and the surrounding material.

Prior art methods have not adequately addressed the need for 3D woven preforms able to be formed into corner fittings without the addition of reinforcing materials and the resultant increase in localized thickness and additional weight. The present invention addresses the shortcomings of the prior art by providing a 3D woven preform that can be formed into a corner fitting with a lap joint without the need for additional reinforcement and associated increase in localized thickness and additional weight.

SUMMARY OF THE INVENTION

Accordingly, the present invention relates to a 3D woven preform and a method of making a 3D woven preform which can be formed into a corner fitting without darting the legs or requiring additional reinforcing materials.

The present invention also relates to a reinforced composite structure comprising a 3D woven preform which can be formed into a corner fitting without darting the legs or requiring additional reinforcing materials and a resin or matrix material.

An embodiment of the present invention is directed to a 3D woven preform comprising a flange or base and at least one leg extending from a major surface of the flange, the preform adapted to being formed into a corner fitting. A lengthwise portion of the leg of the preform is produced with one or more independently woven layers in the area of the desired corner. The one or more woven layers of the preform leg are woven independently of each other and independently of the flange, and are woven from fibers or yarns typically comprising materials such as glass, carbon, ceramic, aramid, polyethylene, and/or other materials which exhibit desired physical, thermal, chemical and/or other properties. Other portions of the leg not in the area of the corner may be woven as a single layer or multilayer of the same or similar thickness as the portion comprising independently woven layers and integrally woven with the flange.

In the lengthwise portion of the leg including independently woven layers, the warp fibers in the leg or legs are divided into groups according to the number of layers to be formed. The warp fibers or yarns of at least one group in the portion of the leg including independently woven layers are carried as warp floats for at least part of the length of the portion. "Floats" as used throughout this disclosure means that the warp fibers or yarns in this section do not weave with any weft fibers or yarns in this section. The warp fibers or yarns of at least one group in the lengthwise portion of the leg are woven with the weft fibers or yarns for at least part of the length of the portion. Along the length of the lengthwise portion of the leg including independently woven layers, the groups of warp fibers or yarns may alternate between being woven or not woven with the corresponding weft fibers or yarns. That is, a group of warp fibers or yarns may be woven with weft fibers or yarns for part of the lengthwise portion of the leg including independently woven layers and not woven with weft fibers or yarns for another part of the lengthwise portion. Similarly, a group of warp fibers or yarns may not weave with weft fibers or yarns for a part of the lengthwise portion of the leg including independently woven layers and woven with weft fibers or yarns for another part of the lengthwise portion.

That is, an independently woven layer in the leg may comprise woven warp and weft fibers or yarns along a part of its length and may comprise floats of warp fibers or yarns not woven with weft fibers or yarns along a different part of its length. In a similar fashion, an independently woven layer in the leg may comprise warp fibers or yarns not woven with weft fibers or yarns along a part of its length and may comprise warp fibers or yarns woven with weft fibers or yarns along a different part of its length. The woven warp/weft fibers or yarn portions parts comprise warp fibers or yarns carried as floats.

The portion of the leg produced with one or more independently woven layers is cut widthwise, usually into two substantially equal length segments (i.e., bisected), with the cut extending to the flange, but not into the major surface of the flange. The preform may then be folded at the line of the cut (i.e., the projection of the cut on the major surface of the flange) such that independently woven layers of one segment overlap and form a joint with independently woven layers of the other segment to form a corner in that region of the cut. The layers of a first leg segment may interleave, or interdigitate, with the layers of the second leg segment such that one or more layers from one leg segment may fill a space between adjacent layers in a second leg segment. In another embodiment of the corner fitting preform above, single independent layers of one leg segment alternatingly interleave with independent layers of another leg segment such that consecutive layers in the overlap or joint area of the legs are from alternating segments. In other embodiments, some, or all, of the layers in the leg segments may overlap without interleaving.

In some embodiments, one or more of the layers are removed from one or both leg segments, with the remaining layers overlapping in a region such that the overlapped region of the leg comprises fewer than the number of independent woven layers of the two segments of the leg. In some embodiments, the overlap region may be the same, or substantially the same, as the thickness of the remaining portion of the leg, i.e., the non-overlap portions, of the leg. For example, in a preform that includes a portion having two independently woven layers, that is, the leg is bifurcated, one layer in each segment could be removed such that the overlap region also comprised two layers. In embodiments with all layers having the same or similar thickness, the overlap region would have the same, or substantially the same, thickness, as the non-overlap portions of the leg. In embodiments with layers of different thickness, the overlap region may or may not have the same thickness as the non-overlap portions of the leg.

In some embodiments of the 3D woven preform in which the leg has a bifurcated portion, the portion comprises a first woven layer and a second woven layer of substantially equal thickness. When the portion of the leg is bisected with a cut to form two segments, each segment contains an equal, or substantially equal, length segment of the first woven layer and of the second woven layer. According to some embodiments, the first woven layer of one segment is removed and the second woven layer of the second segment is removed such that, upon folding the preform into the desired corner fitting shape, the overlap region has the same, or substantially the same thickness as the non-overlap portions of the leg, and comprises a first woven layer and a second woven layer, taken from different segments. The overlap portion is then coplanar with at least the immediately adjacent portions of the leg on either side of the overlap. Accordingly, in this embodiment, there is no, or substantially no, variation in leg thickness between the overlap region and the non-overlap regions of the leg immediately adjacent to the overlap.

In embodiments in which one woven layer from a first segment overlaps a woven layer from a second segment, the joint formed is sometime referred to as a single lap joint. In some situations, the characteristics of a single lap joint may be adequate or desirable.

Some embodiments include a trifurcated portion of the leg, i.e., the portion includes three independently woven regions, and can be formed into a 3D woven corner fitting in a manner similar to that described above. The trifurcated portion comprises a first outer layer, an inner or middle layer, and a second outer layer. Upon bisecting the trifurcated portion into two segments, a corner fitting can be formed by bending the 3D woven preform along the line of the cut such that the three woven layers of one leg segment overlap the three woven layers of the other leg segment, with or without interleaving, or the woven layers of the legs may be partially interleaved.

In embodiments of the 3D woven corner fitting in which a trifurcated portion is to be formed into an overlap joint region having the same or similar thickness as the non-overlap portions of the leg, layers are removed from each segment such that the overlap portion comprises the same number of woven layers as the non-overlap portions. For example, one woven layer could be removed from one leg segment and two woven layers removed from the other leg segment such that the total number of woven layers in the overlap region is three. If each of the woven layers is of the same thickness, the overlap region will be the same or substantially the same thickness as the non-overlap regions of the leg. In embodiments with woven layers of different thickness, the overlap region may or may not have the same thickness as the non-overlap portions of the leg.

In one embodiment comprising a trifurcated portion bisected into two trifurcated regions, the first and second outer layers are removed from a first leg segment, leaving only the middle (inner) segment in the region. In the second leg segment, only the middle layer is removed. Upon folding the preform into the desired corner fitting shape along the projection of the plane of the cut separating the segments on the flange, the remaining middle (inner) woven layer of the first segment maybe placed between the first and second woven outer layers of the second segment, filling the space previously occupied by the middle (inner) woven layer of the second segment.

In this embodiment, the overlap region of the legs forms a double lap shear joint and, if the three woven layers in the leg segments are of equal thickness, the overlap region is of substantially the same thickness as the non-overlap portions of the leg. A double lap shear joint may have desirable properties for some applications. Some embodiments provide an overlap region having the same thickness as the non-overlap regions of the leg, in which the overlap portion is substantially coplanar with at least the immediately adjacent portion of the leg, and eccentric loading of the overlap region may be reduced over other types of overlap joints.

Embodiments described above could have a single leg, for example, 3D woven corner fittings with an L or T cross-sectional profile, with one portion of independently woven layers for ease of description only. Similar preforms can be formed with two legs extending from the same surface of the flange, forming the 3D woven Pi profile preforms discussed above. The discussion above, regarding the formation of an overlap region in a leg comprising a plurality of independently woven layers, is appropriate regardless of the number of legs extending from the side of the flange. Preforms having a plurality of legs may have one or more legs comprising independently woven layers forming overlap regions.

In embodiments of a 3D woven preform with a Pi cross section lap joint for use as a corner fitting, for example, each leg of the preform may have a portion comprising independently woven layers. At least in the area in which the corner is to be formed when the preform is subsequently folded into a desired form, the portion of the first leg in the area of the to-be-formed corner is substantially parallel to the portion of the second leg in a similar area. The independently woven layers in the first and second legs may be coextensive, or substantially coextensive. A cut is made perpendicular to the legs and perpendicular to the flange in the area, or location, of the desired corner. The cut extends through the depth of the leg up to, but not including, the surface of the flange and bisects the portion of the leg with the independently woven layers into two regions substantially equal in length and depth.

As with the T- and L-cross-section 3D woven preforms, the 3D woven Pi cross-section preform, for example, may include a leg (or legs) comprising a plurality of independently woven layers. As discussed above, the leg(s) may be cut, bisecting the region of independently woven layers. When the preform is folded along the projection of the plane of the cut on the flange into the desired corner fitting shape, portions of the legs may overlap as described above for the single leg. The leg portions may overlap with or without interleaving, or overlap with partial interleaving. In some embodiments, the overlap portion may be formed such that the overall thickness of the overlap portion is substantially the same as a non overlap portion of the leg. This can be achieved by selectively removing woven layers from each leg segment such that the total number of layers, and the total thickness, in the overlap region after the preform is folded is the same as found in the portions of the as-woven leg prior to the preform being folded.

In one embodiment of the 3D woven preform with a bifurcated leg, a first woven layer from one segment of a leg and a second woven layer from a second segment from the other leg may be removed. In embodiments in which the layers are substantially the same thickness in the legs, the overlap portion, comprising one layer from each portion, with have substantially the same thickness as a non-overlap portion.

In one embodiment of a 3D woven preform with trifurcated legs, an inner (middle) layer of a first segment of a leg portion is removed and the first and second outer layers of the second segment of that leg portion are removed such that the remaining inner layer can fit in the space from which the inner layer was removed from the first segment. Similarly, the outer layers of a segment of the second leg can be removed and the inner layer of the second segment of that leg can be removed such that the inner layer of one segment fits between the layers of the other segment. Other schemes for layer removal or layer overlap may be used. In, for example, a 3D woven Pi-shaped preform used for corner fitting, the scheme for removal of woven layers from a first leg in the overlap region may be the same as, or different than, the scheme of woven layer removal in the second leg. In the overlap region, the scheme for overlap of woven layers in a first leg may be the same as, or differ from, the scheme for overlap of woven layers in the second leg.

In embodiments of a 3D woven Pi preform with trifurcated (or bifurcated, or both) legs folded into the desired corner fitting shape in which one inner woven layer of a segment is interleaved between two woven layers of a second segment, a double lap joint is formed. In some instances, it may be desirable to form double lap joints in the corner fitting using one or both legs of a Pi-shaped preform, for example. Double lap joints in the corner fitting using the 3D woven preform may possess desirable characteristics for certain applications, such as increased strength, over some other types of joints.

The completed 3D woven preforms described above, may be processed into a reinforced composite structure with the introduction of a matrix material such as, but not limited to, epoxy, bismaleimide, polyester, vinyl-ester, ceramic, carbon, or other materials which exhibit desired physical, thermal, chemical, or other properties, using conventional techniques such as, but not limited to, resin transfer molding or chemical vapor infiltration. The preform is infused with the resin or matrix material, resulting in a reinforced composite structure.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are apparent from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings, in which like references denote like or similar elements and parts, and in which.

DETAILED DESCRIPTION

Embodiments of the invention are described below with reference to the accompanying drawings which depict embodiments of the disclosed preform and exemplary applications thereof. However, it is to be understood that applications of the disclosed preform is not limited to those embodiments illustrated. Also, the invention is not limited to the depicted embodiments and details thereof, which are provided for purposes of illustration and not limitation.

Figure 1A:
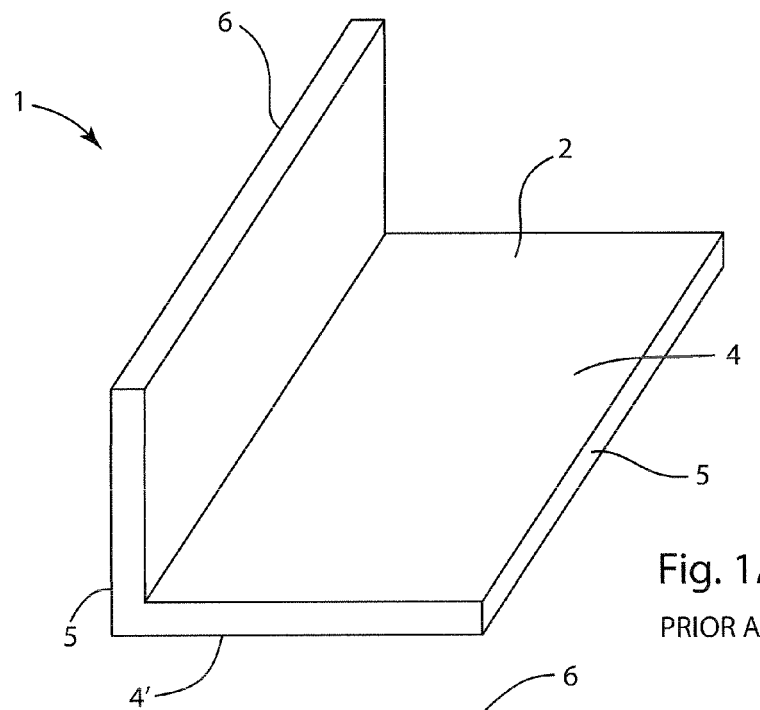
FIGS. 1A-1C are perspective views of typical prior art 3D woven preforms.
Figure 1B:
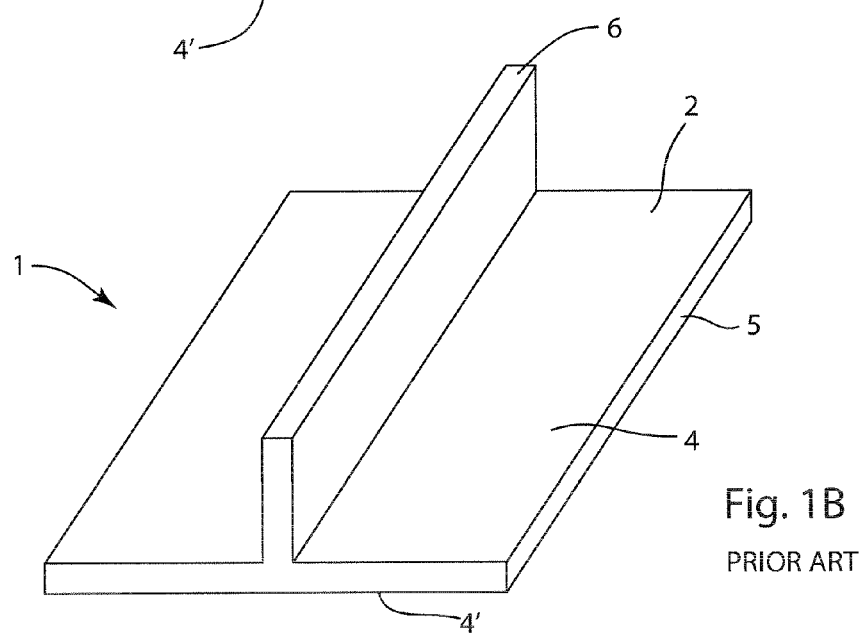
Figure 1C:
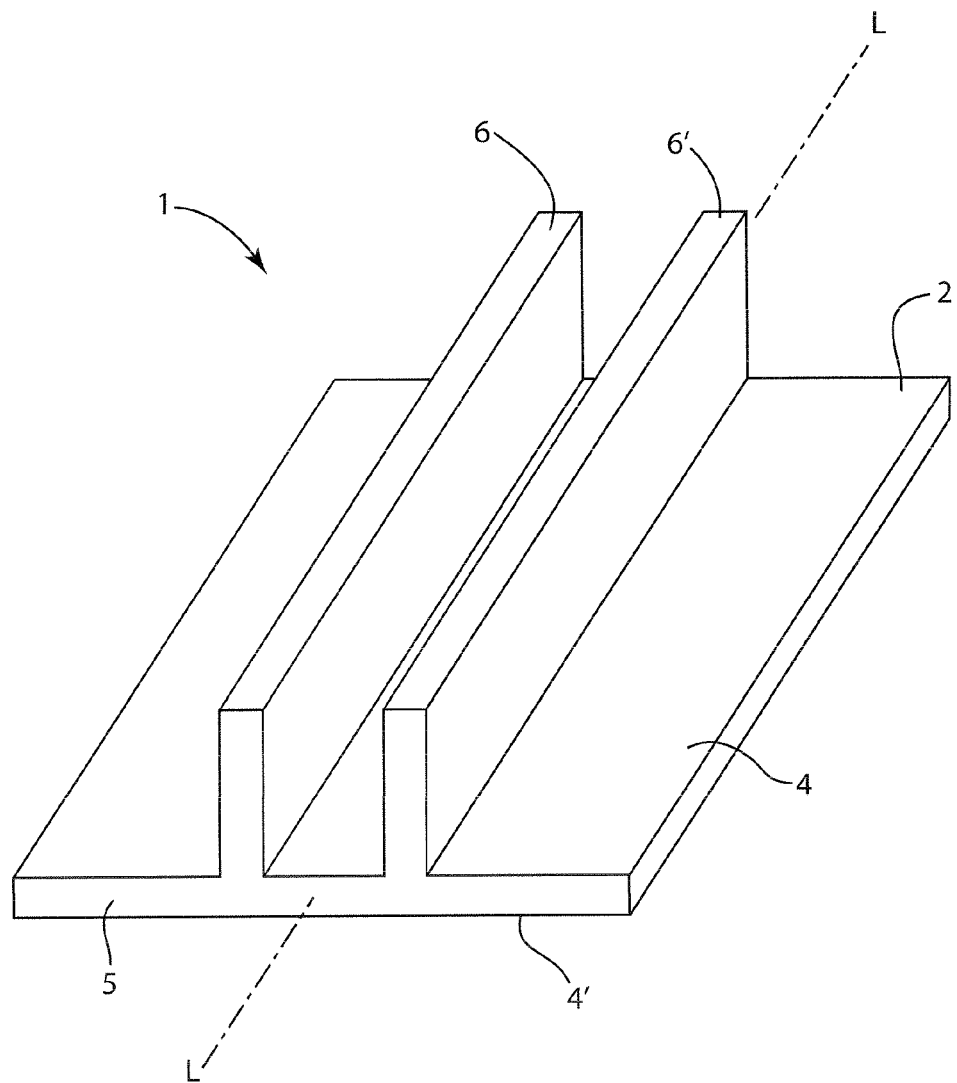

The present invention relates to three-dimensional (3D) woven preforms which can be formed into a corner fitting with lap joints without darting of the legs or flange or the addition of reinforcing materials at the corner or other locations and a method of forming such preforms. Examples of prior art 3D woven preforms 1 are shown in FIGS. 1A-1C, which illustrate L-, T-, and Pi-cross-section preforms, respectively. Other configurations of 3D preforms are possible. Planar flange 2 comprises two major surfaces 4 and 4', at least one edge surface 5, and one or more upstanding legs 6 extending from one major surface 4.

A leg 6 may be positioned along an edge of the flange 2 aligned with edge surface 5 as shown in FIG. 1A, forming an L-preform cross-section. A T-preform cross-section comprises a leg 6 extending from a major surface 4 located between edge surfaces 5 of the preform as shown in FIG. 1B. The leg 6 may be aligned with the longitudinal axis L of the preform 1 for at least a portion of the leg's length. A Pi-preform cross-section comprises two legs 6, 6' extending from a major surface 4 of the flange 2. The legs 6, 6' may be linear or non-linear, and parallel to the longitudinal axis L for at least a portion of the legs' lengths.

The present invention may use any of the above-mentioned 3D woven preform cross-sections in a manner that will be readily apparent from the following discussion. The present invention may also use other 3D woven preform cross-sections, for example preforms with more than two upstanding legs, as will be apparent from the following disclosure. Portions of the disclosure may be directed to one particular type of preform; however, the description applies to all three-dimensional (3D) woven preforms comprising a flange and at least one upstanding leg unless the context indicates otherwise.

Figure 2:
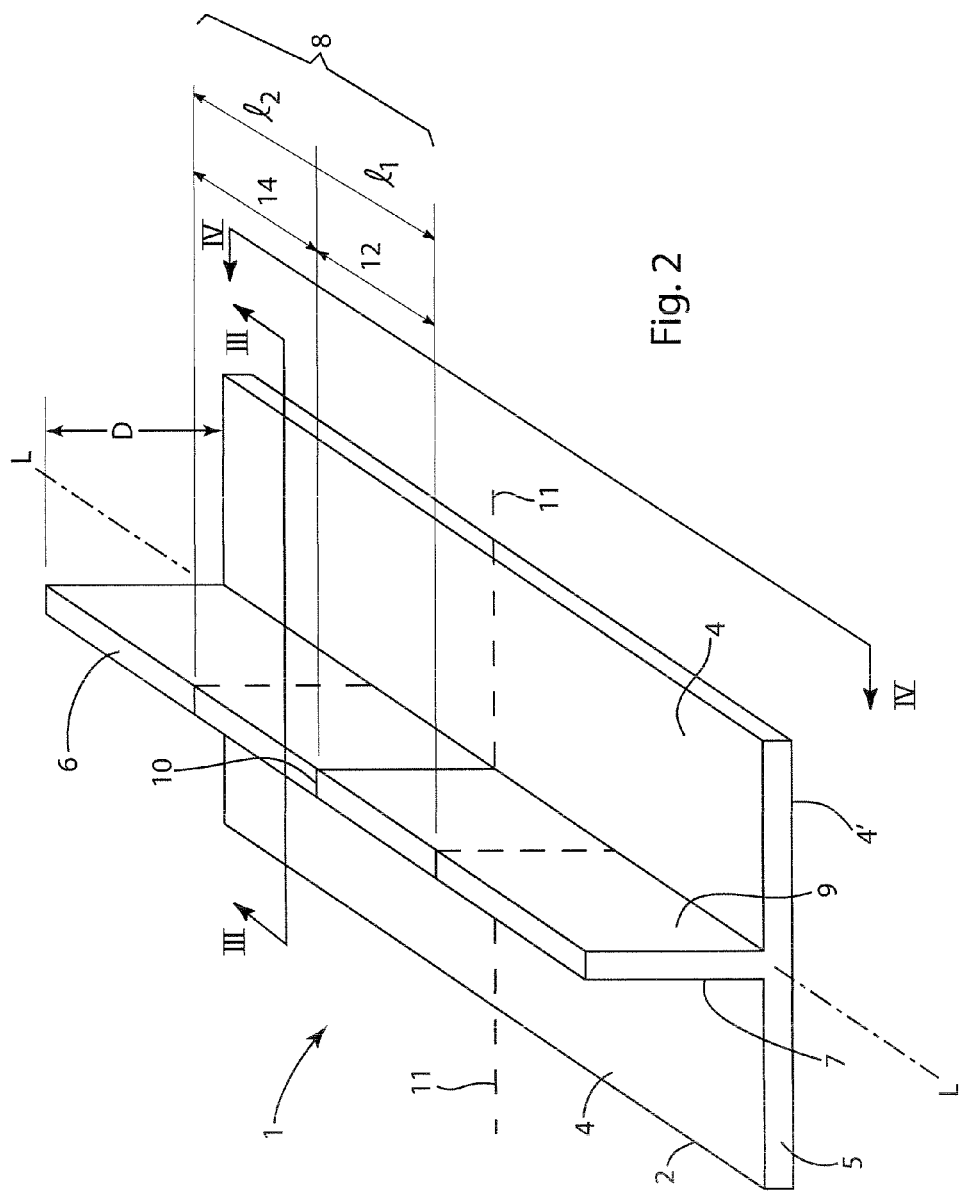
FIG. 2 is a perspective view of a preform according to an embodiment of the present invention.

FIG. 2 illustrates a 3D woven T-cross-section preform 1 according to an embodiment of this invention. It will be clear to one of ordinary skill that the construction and techniques illustrated are suitable for use in 3D woven L- and Pi-cross-section preforms as well. Planar flange 2 comprises a planar major surface 4 and a generally parallel opposite major surface 4', a longitudinal axis L, and at least one edge surface 5. Upstanding leg 6 is arranged substantially parallel to longitudinal axis L and comprises a first outer side 7 and a second, generally parallel outer side 9. At least one portion 8 along the longitudinal length of the leg 6 is comprised of a plurality of independently woven layers to be discussed more fully below (one portion 8 is shown). Portion 8 is bisected by cut 10 into first segment 12 and second segment 14. Cut 10 is made through the depth D of leg 6 at the location of the cut to the major surface 4. The plane of cut 10 is perpendicular to leg 6 and flange major surface 4 at the location of the cut. The projection of cut 10 on major surface 4 of the flange 2 provides line of cut 11.

In embodiments of the present invention, segments 12 and 14 have the same depth D and are of the same length, $l_1$ and $l_2$, respectively, or substantially the same length, along longitudinal axis L. In some embodiments, $l_1$ and $l_2$ may be the same length and equal to the depth D of the leg 6. Other dimensional relationships between segments 12, 14, and D are possible and may influence the characteristics of the formed corner fitting as will be clear from the following discussion.

Figure 3A:
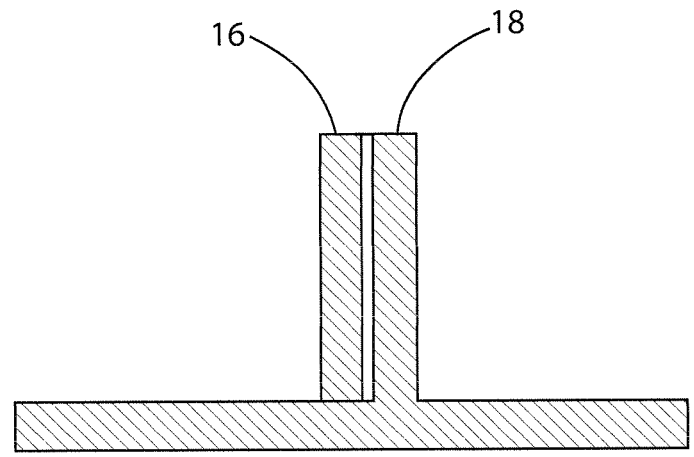
FIG. 3A is a section view taken and the line III-III of FIG. 2 according to one embodiment of the invention.
Figure 3B:
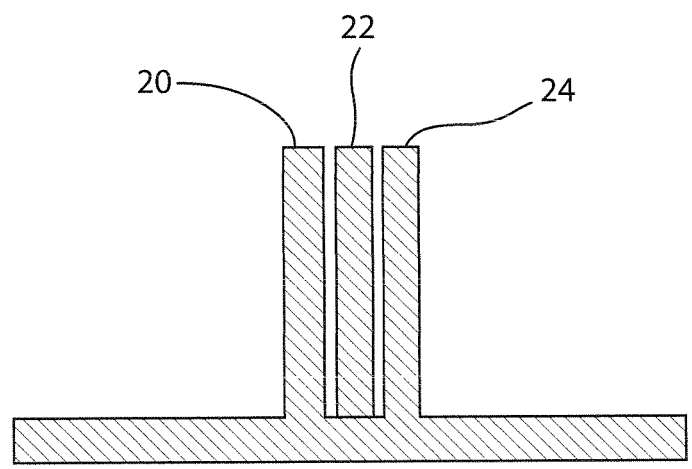
FIG. 3B is a section view taken and the line III-III according to another embodiment of the invention.

FIGS. 3A and 3B are sectional views taken along line III-III in FIG. 2 of two embodiments of the present invention. FIG. 3A illustrates second segment 14 of portion 8 woven with two independent layers 16 and 18. Because the entirety of portion 8 is woven with two independent layers, first segment 12 (not shown in section) also comprises two independently woven layers 16, 18. In this embodiment, portion 8, woven with two independent layers 16 and 18, is said to be a bifurcated portion, and segments 12 and 14 are bifurcated segments, both comprising independent woven layers 16 and 18. As illustrated in FIG. 3A, independently woven layer 16 is carried as a float, that is, warp fibers in layer 16 are not woven with weft fibers (float). The warp fibers of independently woven layer 18 are woven with weft fibers. Segment 12 may be woven in the same scheme, or the warp fibers woven with weft fibers and the warp fibers not woven with weft fibers may be switched such that layer 16 has warp fibers woven with weft fibers and warp fibers in layer 18 are not woven with weft fibers (float).

FIG. 3B illustrates another embodiment of the invention in which second segment 14 of portion 8 is woven with three independent layers 20, 22, and 24. In this embodiment, portion 8, woven with three independent woven layers 20-24, is said to be a trifurcated portion, and segments 12 and 14 are trifurcated segments, also with independent woven layers 20-24. As illustrated in FIG. 3B, the warp fibers in outer two layers 20 and 24 are woven with weft fibers, and the warp fibers of layer 22 are not woven with weft fibers, that is, layer 22 is carried as a float.

Other arrangements of warp fibers woven with weft fibers and warp fibers not woven with weft fibers in a trifurcated segment may be used according to embodiments of this invention. For example, segment 12 (not shown in section) may be formed such that the warp fibers in the outer two layers 20 and 24 are not woven with weft fibers, and the warp fibers of layer 22 are woven with weft fibers, i.e., the opposite of segment 14 as illustrated in FIG. 3A. In this configuration, layers 20 and 24 are carried as floats.

Figure 4A:
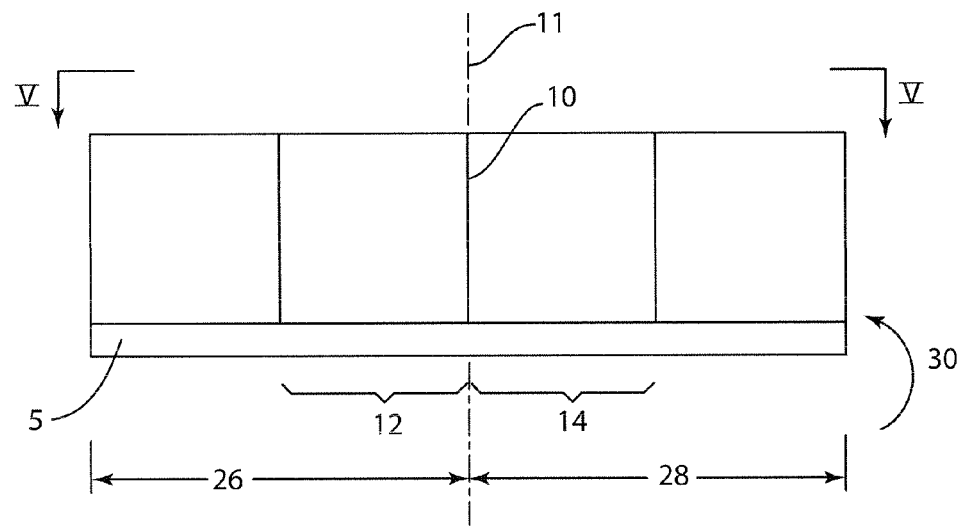
FIG. 4A is a side view of the preform of FIG. 2 taken as indicated by IV-IV.

FIG. 4A is a side view of the 3D woven preform 1 of FIG. 2 taken along line IV-IV. A corner fitting can be formed from the preform according to the present invention by folding the preform 1 at line of cut 11 along major surface 4 of flange 2. For example, left side 26 of the preform 1 may be held stationary while right side 28 is rotated upwards as indicated by arrow 30, allowing the preform to pivot about the bottom of cut 10, along the projection of the plane of cut 10 along major surface 4, which establishes the fold line 11.

Figure 4B:
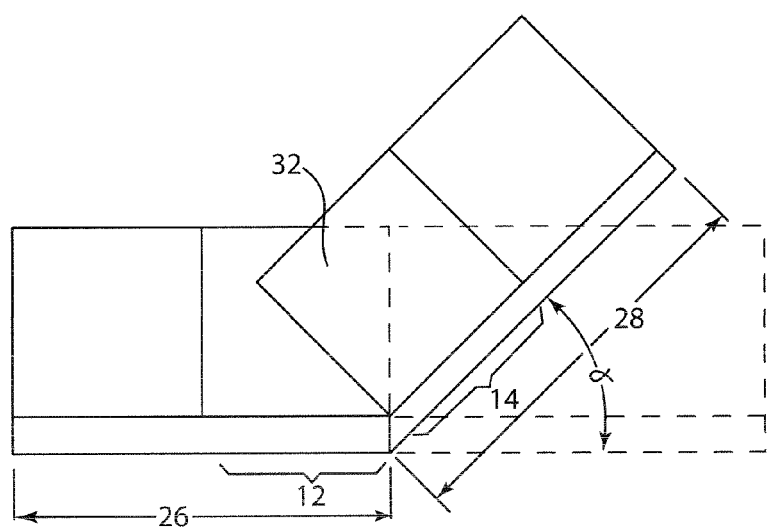
FIG. 4B is a side view of the preform of FIG. 4A with the right side in a first rotated position.

FIG. 4B illustrates the right side 28 of preform 1 of FIG. 4A rotated an amount $\alpha$ about the fold line 11. The original position of right side 28 is shown in phantom. Rotated as shown in FIG. 4B, a portion of segment 14 (shown in solid) partially overlaps a portion of segment 12 (shown in phantom) in an overlap region, generally 32. As right side 28 is further rotated in the direction indicated by 30, the amount of overlap 32 increases.

Figure 4C:
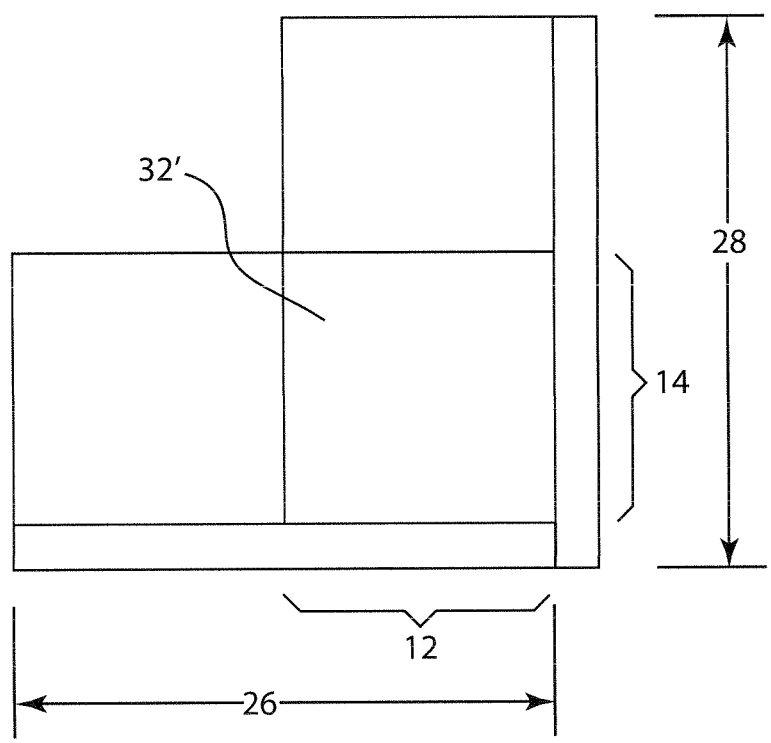
FIG. 4C is a side view of the preform of FIG. 4A with the right side in a second rotated position.

FIG. 4C illustrates right side 28 of preform 1 rotated such that $\alpha$ is approximately 90° from the representation of FIG. 4A such that similarly dimensioned segments 12 and 14 fully overlap in the overlap region identified as 32'. A full overlap region is achieved when length of segment 12 ($l_1$)=length of segment 14 ($l_2$)=D, most clearly shown in FIG. 2. Other relationships between l1, l2, and D are possible and may affect the amount of overlap, particularly in region 32' when preform sides 26 and 28 are arranged at 90° to each other.

When angle $\alpha$ is 90°, left and right sides 26, 28 are arranged at right angles to each other. When angle $\alpha$ is greater than 90°, left and right sides 26, 28 form an acute included angle and when angle $\alpha$ is less than 90° but greater than 0°, left and right sides 26, 28 form an obtuse included angle.

The independent woven layers within segments 12 and 14 may overlap in any desired configuration. For example, the independent woven layers in one segment may interleave with the independent woven layers in the other segment in any convenient scheme. The parts of leg 6 not included in the overlap region, that is the parts of leg 6 outside of portion 8, comprise a non-overlap region or regions.

Overlap region 32' may comprise the complete thicknesses of segments 12 and 14, making the region 32' twice as thick as the individual segments or a non-overlap region. In many situations, it is desirable to eliminate the double thickness in the overlap region. According to embodiments of the invention, the increased thickness in the overlap region 32 is reduced by removing one or more independent woven layers from each segment 12 and 14.

For example, in embodiments in which portion 8 of leg 6 is bifurcated, that is, comprises two independent layers 16, 18, one woven layer from segment 12 can be removed and one woven layer from segment 14 can be removed. The layer removed is the layer with warp fibers carried as floats, that is, not woven with weft yarns. The overlap region 32, 32' would then comprise two layers rather than four, and the thickness in the overlap region 32 or 32' would be the same, or substantially the same as original segments 12, 14, or the same or substantially the same as non-overlap portions of leg 6.

Figure 5A:
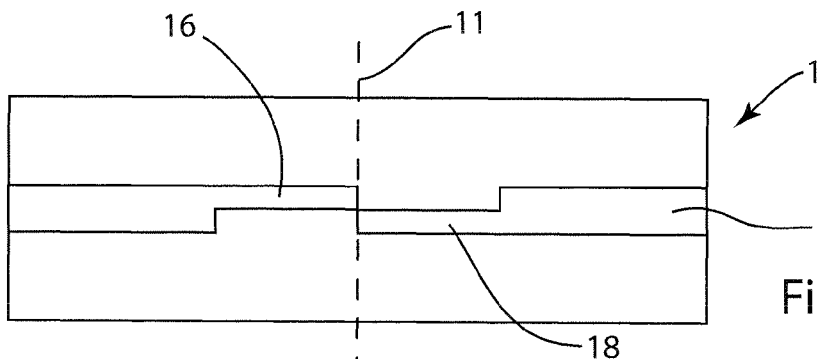
FIGS. 5A-5C are top views of the preform of FIGS. 4A-4C along line V-V according to an embodiment of the invention.
Figure 5B:
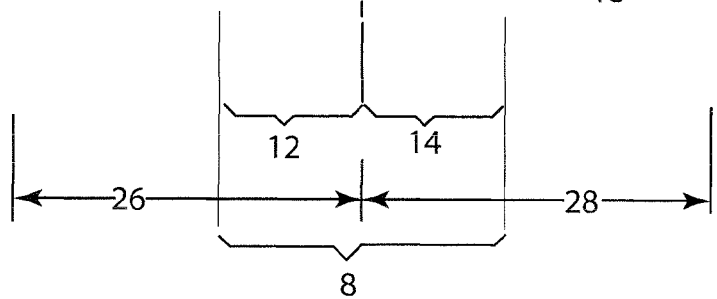

FIG. 5A is a top view of 3D woven preform 1 of FIG. 4A taken according to line V-V. According to this embodiment, leg 6 is bifurcated and therefore corresponds to the sectional view of FIG. 3A. As shown in FIG. 5A, woven layer 18 has been removed from segment 12 and woven layer 16 has been removed from segment 14. FIG. 5B, corresponding to FIG. 4B, illustrates right side 28 of the preform 1 rotated an amount about the fold line 11. As illustrated, right side 28 is coming out of the plane of the paper and angle $\alpha$ is not shown. Layer 16 of segment 12 and layer 18 of segment 14 partially overlap in a region 32.

Figure 5C:
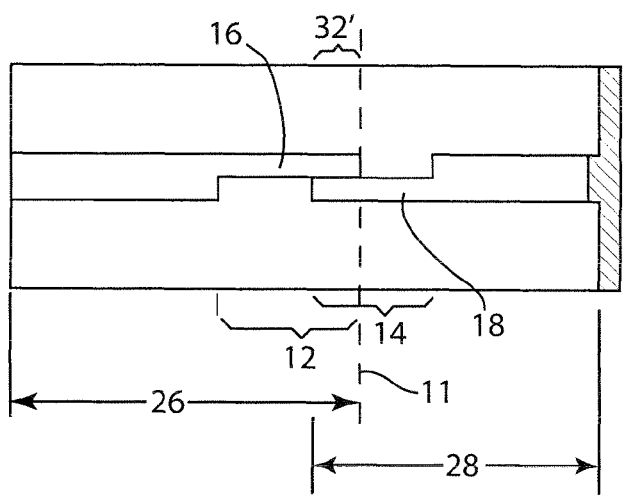
Figure 5C:
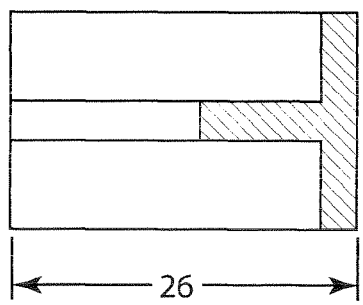

FIG. 5C corresponds to FIG. 4C in a view along V-V and illustrates right side 28 rotated about fold line 11 approximately 90° from the position represented in FIG. 5A. Layer 16 and layer 18 fully, or substantially fully, overlap each other as best illustrated as region 32' from FIG. 4C. In this embodiment, a single lap joint is formed in overlap region 32' with an overlap thickness substantially the same as the non-overlapped segments. The bond line of the joint, that is the interface between the abutting surfaces of layer 16 and 18, may be aligned with the centerline of the leg 6 when layers 16 and 18 are of equal thickness. In embodiments in which layers 16 and 18 are not the same thickness, the bond line of the joint may be offset from the centerline of the leg 6.

It would now be obvious to one of skill in the art that removing woven layer 16 from segment 12 and removing woven layer 18 from segment 14, would allow a joint to be formed as above, and would provide substantially the same result. In this case, woven layer 16 of segment 12 and woven layer 18 from segment 14 would have warp fibers as floats, that is, the warp fibers in these segments would not be woven with weft fibers.

Embodiments of the present invention in which a leg 6 comprises a trifurcated portion 8 as illustrated in FIG. 3B can be similarly formed into a corner fitting. As above, independently woven layers 20, 22, 24 of a first segment can interleave with the independently woven layers 20, 22, 24 of a second segment. The joint formed in the overlap region, similar to overlap regions 32 or 32' of FIGS. 4B and 4C, may comprise twice the number of independently woven layers in portion 8. Consequently, the joint or overlap region is twice as thick, or substantially twice as thick, as unfolded portion 8 or a non-overlapped segment 12, 14 of leg 6.

According to embodiments of the invention, the increased thickness in the overlap region 32 or 32' can be reduced by removing one or more independently woven layers 20, 22, 24 from each segment 12 and 14 of a trifurcated portion 8. The woven layers to be removed are those with warp fibers as floats. The total number of woven layers to be removed may equal the number of woven layers in one segment, thus forming an overlap region 32 or 32' having the same or substantially the same thickness as segments 12 or 14, or substantially the same thickness as the non-overlap parts of leg 6. In a trifurcated region as illustrated in FIG. 3B, there are three layers, 20, 22, 24. However, all three woven layers cannot be removed from the same segment 12 or 14 to reduce the overlap thickness. At least one woven layer must remain in a first segment and at least one woven layer must be removed from a second segment. Reference to first and second segments is for convenience of description and either segment 12 or 14 of the portion 8 of a leg 6 may be considered the first segment or the second segment.

Figure 6A:
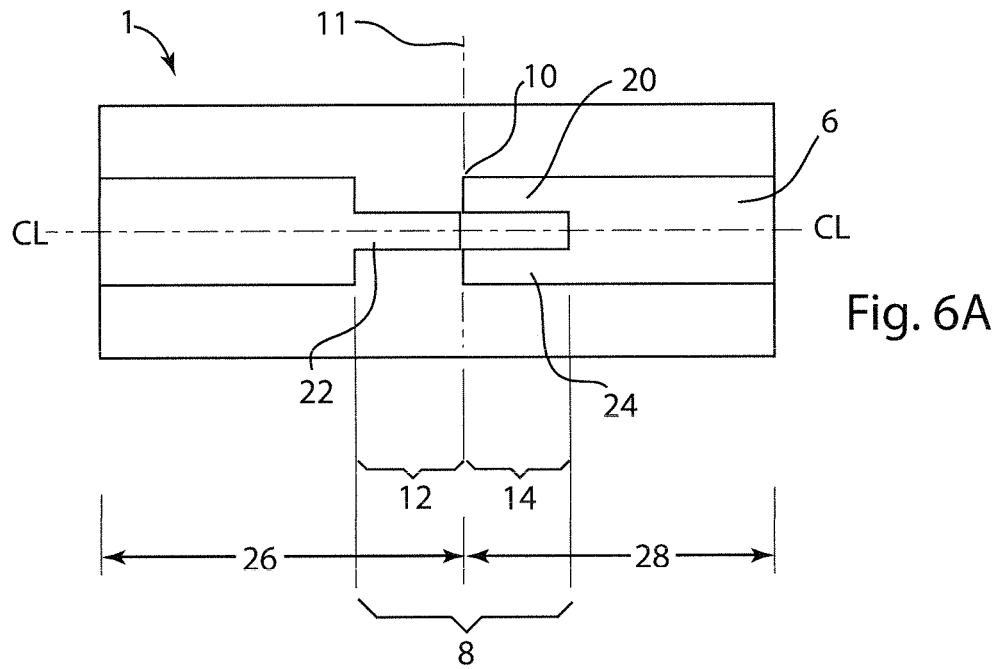
FIGS. 6A-6C are top views of the preform of FIGS. 4A-4C along line V-V according to an embodiment of the invention.

For example, FIG. 6A is a top view of a trifurcated portion 8 of a 3D woven preform taken along line V-V of FIG. 4A according to an embodiment of the invention. In this embodiment, portion 8 comprises three independently woven layers 20, 22, 24, that is the portion 8 is trifurcated. Woven layers 20 and 24 are first and second outer layers, the outer surfaces of which correspond with first and second outer sides 7 and 9 respectively. Middle woven layer 22 is located between layers 20 and 24.

In a non-limiting example of an overlap joint region of the desired corner fitting having the same or substantially the same thickness as a non-overlap region, woven layers 20 and 24 are removed from segment 12 and woven layer 22 is removed from segment 14 in the embodiment of FIG. 6A. The removal of woven layers 20 and 24 from segment 12 provides space for woven layers 20 and 24 of segment 14 when right side 28 of preform 1 is rotated about fold line 11 to fold the preform to form a corner fitting, as indicated by 30 in FIG. 4A. Likewise, the removal of woven layer 22 in segment 14 provides a space for remaining woven layer 22 in segment 12 when the preform 1 is folded.

Figure 6B:
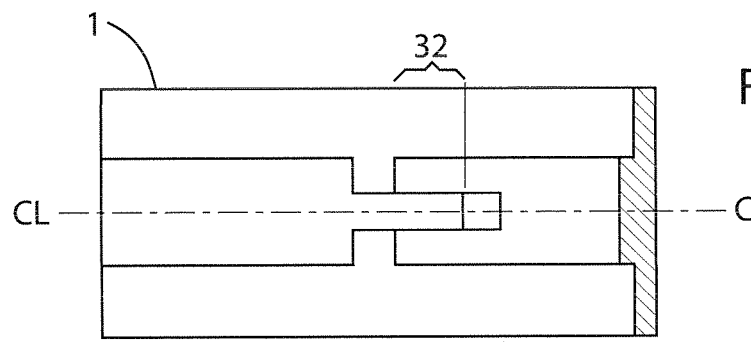

FIG. 6B, corresponding to FIG. 4B, illustrates right side 28 of the preform 1 rotated an amount α (not shown) about the fold line 11. As illustrated, right side 28 is coming out of the plane of the paper. Woven layer 22 of segment 12 is received between woven layers 20 and 24 of segment 14, with woven layers 20 and 24 partially overlapping woven layer 22 in a region 32.

Figure 6C:
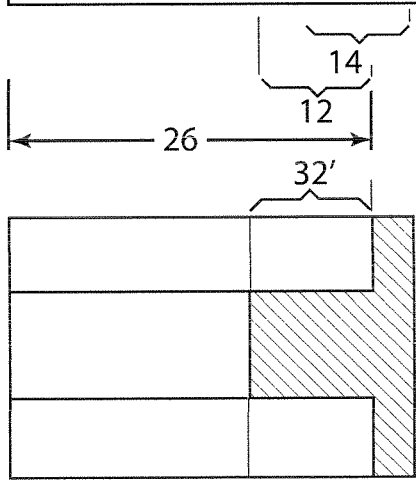

When preform 1 is folded approximately 90° from the illustration of FIG. 6A to form a corner fitting, shown in plan view in FIG. 6C and side view in FIG. 4C, woven layer 22 of segment 12 is fully, or substantially fully, within the space between woven layers 20 and 24 of segment 14, the space provided by the removal of woven layer 22 from segment 14. The overlap thus formed is often referred to as a double lap joint which has characteristics desirable in certain applications. In embodiments in which woven layers 20, 22, and 24 are of the came thickness the assembled joint in the overlap region 32' is symmetrical about the centerline of the leg 6. Characteristics of the symmetrical double lap joint are often desirable.

In trifurcated embodiments in which woven layers 20, 22, and 24 are substantially the same thickness, as in FIGS. 6A-6C, a joint symmetric about the centerline CL of leg 6 may be formed. In a symmetric joint, the bond lines formed at the interface of woven layer 22 with woven layer 20 and at the interface of woven layer 22 with woven layer 24 are substantially equidistant from the centerline CL. Alternatively, if layers 20, 22, and 24 are not substantially the same thickness, the bond lines may be offset different distances from the centerline CL of the leg 6.

In an embodiment of a trifurcated portion 8, woven layers 20 and 24 may be substantially one fourth of the thickness of the leg 6 and woven layer 22 may be substantially one half the thickness of the leg 6. Woven layers 20, 24 may be removed from a first side of cut 10 and woven layer 22 removed from the second side of cut 10. When the preform 1 is folded as described above along fold line 11, remaining woven layer 22 on the first side of may be placed between remaining layers 20, 24 on the second side of the cut 10. The resulting double lap joint is symmetrical about the centerline of the leg 6.

Other divisions of the thickness of leg 6 in which woven layers 20, 24 are substantially the same thickness and woven layer 22 is substantially twice that thickness can also be used to provide a symmetrical double lap joint. Fro example layers 20 and 24 may each be ⅙ the thickness of the leg 6 and woven layer may be ⅓ the thickness. When folded as above, the total thickness of the double overlap joint will be the total thickness of the leg 6.

In alternative embodiments, left side 26 of the 3D woven preform 1 could comprise woven layers 20 and 24, and right side 28 have woven layers 20 and 24 removed. The formation of the corner joint by overlapping the layers would be essentially the same as in the example illustrated in FIGS. 6A-6C and discussed above, and a similar double lap joint would be formed.

Figure 7:
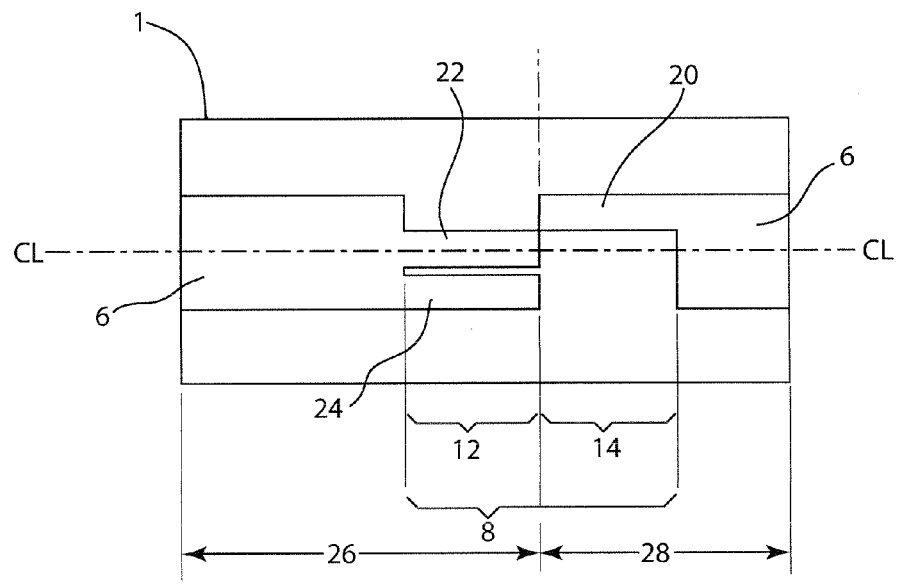
FIG. 7 is a top view of the preform of FIG. 4A along line V-V according to an embodiment of the invention.

Alternatively, embodiments of the present invention can provide an offset lap joint in an overlap region 32' comprising a trifurcated portion 8. For example, in FIG. 7, a 3D woven preform 1 similar to that of FIG. 6A is shown with trifurcated portion 8. In this embodiment, left side 26 of preform 1 comprises woven layers 22 and 24 only, and right side 28 comprises only woven layer 20. Formation of an overlap region can be achieved as in the previous examples, and is not shown for this embodiment. In this embodiment, however, the bond line may be between adjacent surfaces of woven layers 20 and 22. Thus an asymmetrical single lap joint can be formed in a leg 6 with a trifurcated portion 8 with the bond line spaced a distance from the centerline of the leg.

Similar schemes can be used to form lap joints in overlapped areas of segments comprising more that three independently woven layers.

Embodiments of the present invention comprising more than one leg 6 are anticipated and may be desirable in certain applications. For example, a 3D woven preform with a Pi-cross-section as shown in FIG. 1C is sometimes useful in aeronautical, aerospace, or other applications. Under some conditions, it is desirable or necessary to form the 3D woven preform with a Pi cross-section into a corner fitting. The leg construction discussed above may be applied to Pi-preforms to allow the formation of a corner.

3D woven preforms with Pi cross-sections may be formed to include two legs, at least one of which comprises a portion 8 comprising one or more independently woven layers. In some embodiments, both the legs of a preform comprise one or more woven layers in at least one location. For example, a portion of each leg (similar to portion 8 of FIG. 2) may comprise a bifurcated leg comprising two independently woven layers (similar to layers 16, 18 in FIG. 3A) or a trifurcated portion comprising three independently woven layers (similar to portion 8 of leg 6 as illustrated in FIG. 3B).

Figure 8:
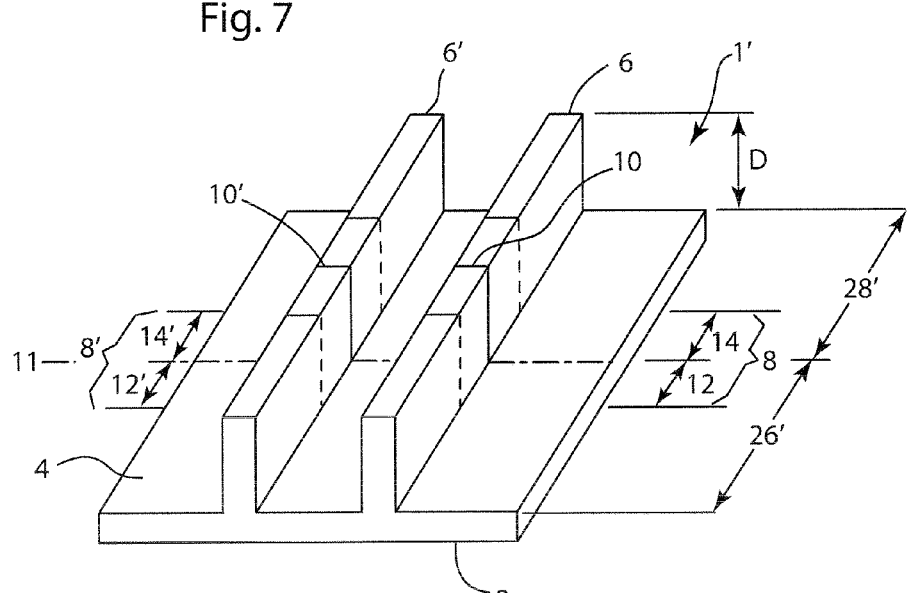
FIG. 8 is a perspective view of a preform according to an embodiment of the present invention.

In embodiments of the invention, a 3D woven Pi-preform 1' is comprised of two legs 6, 6' as illustrated in FIG. 8, each leg 6, 6' comprising a portion 8, 8' respectively, having one or more independently woven layers as discussed above. In at least one location, the portion 8 of a first leg 6 and the portion 8' of second leg 6' are parallel and coextensive as illustrated in FIG. 8. Portions 8 and 8' are cut at 10 and 10' through the depth D of the legs to the flange major surface 4. Cut 10 is perpendicular to legs 6, 6' and major surface 4 of the flange 2 at least at the location of the cut. The projection of the cut 10 on surface 4 provides a fold line 11.

The preform 1' of FIG. 8 may be formed into a corner fitting by folding the preform along fold line 11 in a manner similar to that illustrated in FIG. 4A-4C. Independently woven layers within segments 12, 14 (and 12', 14') may overlap as the right side of preform 28 is rotated about fold line 11 and as left side 26 remains stationary as in FIG. 4B. As the independently woven layers (12, 14) and (12', 14'), respectively within 8 and 8' overlap, they may interleave in any scheme discussed above. For example, independently woven layers within segment 14 may alternatingly interleave with independently woven layers within segment 12. Alternatively, more than one consecutive independently woven layer within a first segment, segment 12 for example, may be placed between two consecutive independently woven layers in a second segment, for example segment 14.

As discussed above, one or more independently woven layers within portions 8 and 8' may have warp fibers carried as floats, that is the warp fibers are not woven with weft fibers. Also as above, the woven layers with warp fiber floats may be removed in the overlap region such that the overlap region is the same thickness, or substantially the same thickness, as the non-overlap portions of the legs. Symmetric and asymmetric bond lines may be formed as discussed above.

Independently woven layers within segment 14' in leg 6' may interleave with independently woven layers within segment 12' employing the same scheme used in leg 6. Alternatively, different schemes may be used in different legs.

Embodiments discussed above illustrate 3-D woven preforms with a flange (or base) and one or more legs according to the present invention formed into corner fittings with an overlap joint. Embodiments discussed above illustrate 3D woven preforms comprising only one portion 8 for clarity of illustration only. Other embodiments may include additional portions 8 constructed similar to the portion 8 discussed above and formed at various positions along the longitudinal length of the leg(s) 6 of the preform 1. Each portion 8 may be folded or formed into a corner fitting with an angle α as discussed above. In some embodiments including more than one portion 8, and therefore more than one corner fitting, the 3D woven preform may be folded at each portion 8 into a U- or C-shaped configuration, or into other open plane figures obtained by folding the preform in the same direction relative to the leg(s).

A closed plane figure, for example a triangle, rectangle, or other simple polygon, can be formed from the 3D woven preform of this invention folded in the same manner. The 3D woven preform may be configured as a regular polygon with n equal sides and n equal angles, or may have sides and angles that are not equal.

In forming a 3D woven preform to be shaped as a simple polygon of n sides, in addition to forming n−1 portions 8 as described, each end of the preform may be formed such that the two ends, when joined, form a lap joint, the end lap joint. The end lap joint may be a single lap joint or a double lap joint, and may be the same as, or different than, the lap joints formed at portions 8 of the 3D woven preform. In the case of a single lap joint, similar to the single lap joint illustrated in FIGS. 5A and 5B, a first end of the 3D woven preform may be formed as illustrated in FIG. 3A, in which the warp fibers in layer 16 are not woven with weft fibers. At the first end of the 3D woven preform, layer 16 may be removed.

At the second end of the 3D woven preform to be shaped as a simple polygon, the warp fibers in layer 18 are not woven with weft fibers. At the second end of the preform, layer 18 may be removed.

Figure 9:
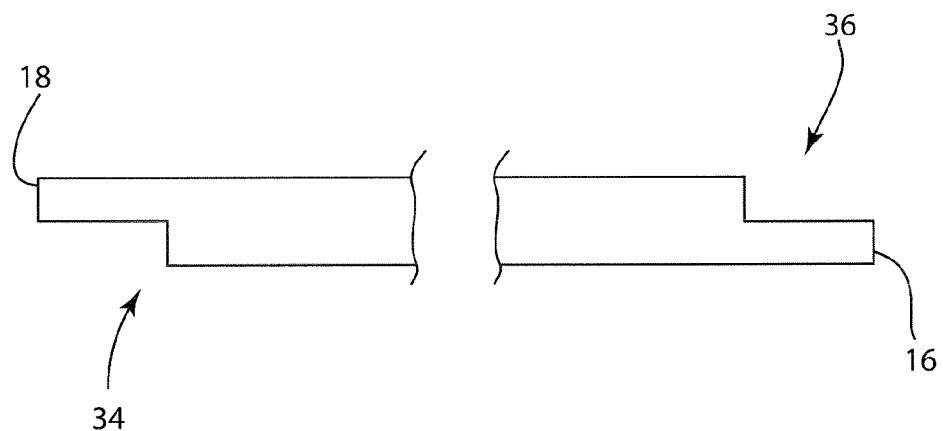
FIG. 9 is a top view of an upstanding leg of a 3D woven preform according to an embodiment of the invention.

According to an embodiment of the invention, the leg of the 3D woven preform may therefore be constructed as shown in FIG. 9, shown with a discontinuity, in which layer 16 of the preform is removed at the first end 34 and layer 18 is removed from the second end 36. Portions 8 between ends 34 and 36 of the 3D woven preform are not shown in FIG. 9.

When folded at the appropriate fold lines 11 as discussed above, ends 34 and 36 of FIG. 9 may be brought into an overlapping relationship, forming the end lap joint, a single lap joint in this case.

In embodiments including an end double lap joint, similar to the double lap joint illustrated in FIGS. 6A and 6B, a first end of the 3D woven preform may be formed as illustrated in FIG. 3B, in which the warp fibers in layer 22 are not woven with weft fibers. At the first end of the 3D woven preform, inner or middle layer 22 may be removed, leaving first and second outer layers 20 and 24. At the second end of the 3D woven preform, the warp fibers in first and second outer layers 20 and 24 are not woven with weft fibers. At the second end of the preform, layers 20 and 24 may be removed, leaving middle layer 22.

Figure 10:
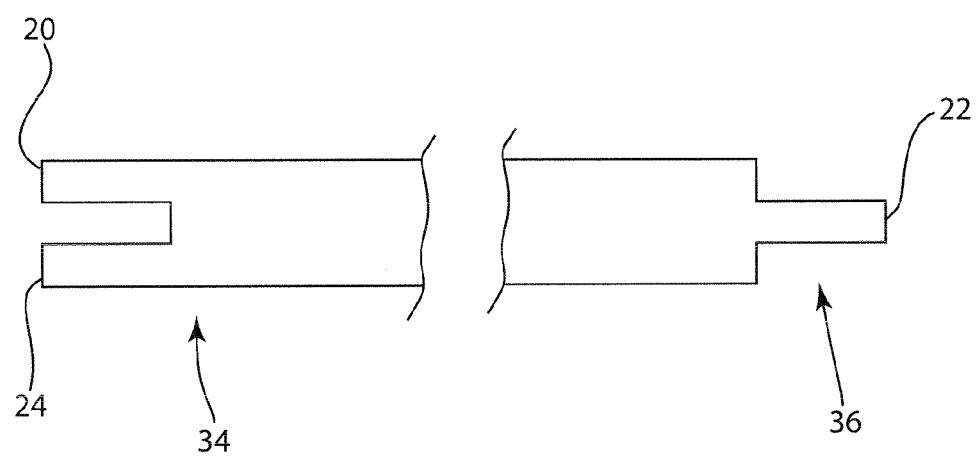
FIG. 10 is a top view of an upstanding leg of a 3D woven preform according to another embodiment of the invention.

According to an embodiment of the invention, the leg of the 3D woven preform may therefore be constructed as shown in FIG. 10, shown with a discontinuity, in which layer 22 of the preform is removed at the first end 34 and layers 20 and 24 are removed from the second end 36. Portions 8 between ends 34 and 36 of the 3D woven preform are not shown in FIG. 10.

When folded at the appropriate fold lines 11 as discussed above, ends 34 and 36 of FIG. 10 may be brought into a relationship in which layer 22 is placed between layers 20 and 24, forming the end lap joint, a double lap joint in this case.

Depending on the configuration of the simple polygon formed from the 3D woven preform, layers 16 and 18 forming the single lap joint at the 3D woven preform ends, or layers 20, 22, and 24 forming the double lap joint at the preform ends, may or may not fully overlap one another. That is, a surface of a layer may or may not fully cover the surface of an adjacent layer.

Having thus described in detail various embodiments of the present invention, it is to be understood that the invention defined by the above paragraphs is not to be limited to particular details set forth in the above description as many apparent variations thereof are possible without departing from the spirit or scope of the present invention.

We claim:

1. A three-dimensional (3D) woven preform comprising:
   a planar flange comprising interwoven warp and weft fibers or yarns and having a first major surface, the planar flange having a cut location;
   a first leg comprising the warp and weft fibers or yarns, the first leg extending from the first major surface of the flange, at least a portion of the first leg comprising a plurality of independently woven layers arranged perpendicular to said major surface,
   a cut through the first leg, a plane of the cut perpendicular to the flange and perpendicular to the leg along the cut location dividing the first leg into a first portion and a second portion, and
   a segment of each of the plurality of woven layers, which include at least one woven layer having warp fibers woven with weft fibers, being removed at a first location of the first portion and a second location of the second portion adjoining the cut location;
   wherein the first portion is at an angle to the second portion and
   wherein the first location and the second location at least partially overlap, and overlap region is of the same thickness as non-overlap regions of the first leg.

2. The preform of claim 1 wherein the remaining segment of each woven layer includes floats.

3. The preform of claim 2 wherein at least a portion of the segment including the floats is removed from each woven layer.

4. The preform of claim 1 further comprising:
- a second leg comprising the warp and weft fibers or yarns, the second leg extending from the first major surface of the flange, at least a portion of the second leg comprising a plurality of independently woven layers parallel and coterminous with the independently woven layers of the first leg a segment from each of the plurality of woven layers of the second leg being removed in either the first portion or the second portion adjoining the cut location; and
- a cut through the second leg, the plane of the cut perpendicular to the flange and perpendicular to the second leg, the cut bisecting the portion of the second leg into a first segment of independently woven layers and a second segment of independently woven layers, such that an independently woven layer of each segment comprises the warp fibers as floats.

5. The preform of claim 4 wherein the layers of the first segment interdigitate with the layers of the second segment.

6. The preform of claim 1 wherein the warp and weft fibers or yarns are made from a material selected from the group consisting of glass, carbon, ceramic, aramid, and polyethylene.

7. A three-dimensional (3D) fiber reinforced composite structure comprising the preform according to claim 1.

8. The composite structure of claim 7 further comprising a matrix material.

9. The composite structure of claim 8 wherein the matrix material is selected from the group consisting of epoxy, bismaleimide, polyester, vinyl-ester, ceramic, and carbon.

* * * * *